United States Patent [19]
Taylor

[11] 3,786,826
[45] Jan. 22, 1974

[54] OIL TANK SKIMMING DEVICE

[75] Inventor: Charles T. Taylor, Port Credit, Ontario, Canada

[73] Assignee: Gulf Oil Canada Limited, Toronto, Ontario, Canada

[22] Filed: June 12, 1972

[21] Appl. No.: 261,836

[52] U.S. Cl. ................................. 134/104, 210/513
[51] Int. Cl. ............................................. B08b 3/00
[58] Field of Search 137/172, 189, 203, 204, 577.5, 137/590, 577, 590.5; 210/537, 540, 541, 542; 138/40, 64; 134/166 R, 104, 22 R, 140

[56] References Cited
UNITED STATES PATENTS
3,207,176   9/1965   Elias .................................. 137/590
1,493,843   5/1924   Conrader .......................... 137/590

Primary Examiner—Samih N. Zaharna
Assistant Examiner—Benoit Castel
Attorney, Agent, or Firm—David Ronald Morrison

[57] ABSTRACT

A device to expedite removal of residual water-immiscible oil from a large tank through a manhole entry in the side of the tank, includes a trough which is inserted through the manhole and levelled, after which water fed into the tank floats the residual oil into the trough from which the oil discharges from the tank through the manhole for recovery or disposal.

4 Claims, 3 Drawing Figures

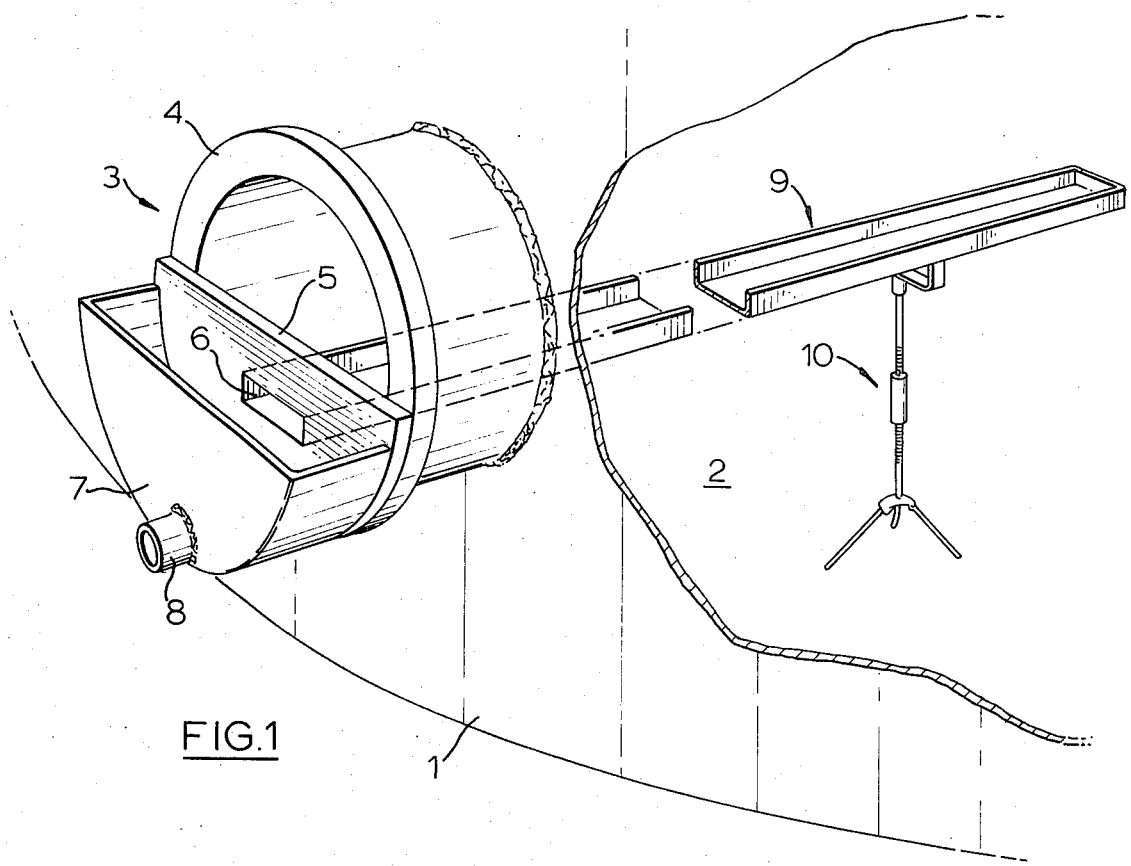
FIG.1
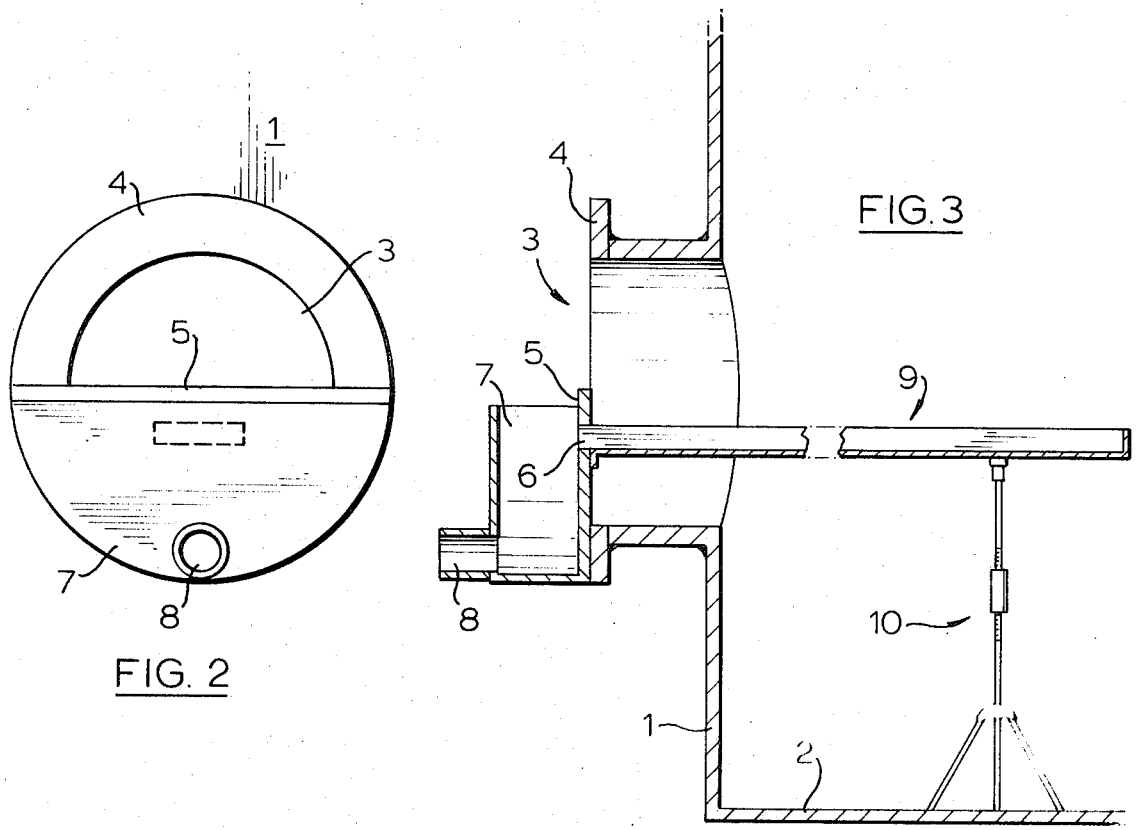
FIG.2
FIG.3

OIL TANK SKIMMING DEVICE

This invention relates to an apparatus for removing the last small quantities of oil from an oil storage tank of large capacity such as is used in petroleum refinery tank fields, and more particularly to an apparatus for skimming the oil from the bottom of a tank by floating the oil from the tank on a layer of water.

Occasionally it is desirable or necessary to clean out an oil storage tank, particularly when it is desired to change the nature of the product that is to be stored in the tank. The large vertical cylindrical storage tanks that are used in the storage fields of petroleum refineries are usually built with steel sides and bottom, resting on a bed of sand or gravel. The bottoms of such tanks are not perfectly level, and frequently have numerous undulations due to settling of the tank on its base. The variations in the bottom of a tank may amount to as much as 3 or 4 inches over the width of a tank of 100 feet or more diameter. When an attempt is made to pump all the liquid from such a tank, there remains a considerable amount of material on the bottom, eg. liquid trapped in the low areas among the undulations on the bottom of the tank. If such liquid remains in the tank when a different product is pumped therein, there is a resultant contamination which can destroy the quality of the newly stored product. For example a residue of fuel oil or furnace fuel oil left in the bottom of a tank that is subsequently filled with gasoline, will contaminate the gasoline with a quantity of heavy nonvolatile material which will ruin the quality of the gasoline. Likewise, a residue of gasoline left in a storage tank which is then used for storage of fuel oil and may destroy its specification on volatile material, making the fuel oil dangerous and unsafe to use as a fuel oil because of its low flash point. The ease with which such contamination can occur may be readily appreciated when it is realized that 3 inches of product in the bottom of a large diameter storage tank may amount to 600 barrels of product. However, the pumping equipment normally used to pump the contents of a storage tank into transfer lines does not readily provide facility for removing the bottom portion of the product in the tank.

It is an object of this invention therefore to provide an apparatus for rapidly removing the last quantity of oil from the bottom of an oil storage tank. This and other objects of the invention will become clear from the following description thereof.

The invention therefore consists in a skimming apparatus to remove water immiscible liquids of specific gravity below one from the bottom of a vertical cylindrical storage tank equipped with a manhole entry near the bottom thereof, said apparatus comprising (1) a vertical flange of shape adapted to be fastened to, and to cover, the lower part of said manhole entry, with an aperture in the flange to permit free flow of liquid through the flange from inside the tank, (2) a receiving vessel fastened to the flange outside the manhole entry below the aperture to receive liquid flowing out of the tank and to conduct same to storage or other disposal, (3) an elongated open trough having level sides of uniform equal height below the level of the top of the vertical flange and with one end fastened to the flange at the aperture to permit flow of liquid by gravity from the trough through the aperture to the receiving vessel, said trough also having (a) a closed end remote from said flange, (b) dimensions to permit its insertion into and removal from the tank through the manhole entry, and (c) adjustable support means near said remote end adapted to support the sides of the trough in a fixed level position throughout their entire length, and (4) means to admit water to the storage tank below the level of the top of the trough at a rate to float the immiscible liquid and thereby force it to overflow the sides of the trough and flow by gravity out of the storage tank through the aperture in the flange into the receiving vessel.

The operability of the present invention is based on the fact that oils generally, and most petroleum fractions in particular, have specific gravities less than one and thus float on water. Furthermore, as it is impractical to preclude some accumulation of water in large petroleum storage tanks, there is substantially always some water in the bottom of such tanks, and no great harm or inconvenience is caused by adding more water as a temporary measure to force oil out of the tank; the added water can subsequently be removed from the tank by pumping, if necessry with the aid of auxiliary field pumps.

A simple embodiment of the invention is illustrated in the accompanying drawings, in which:

FIG. 1 is sketch showing an apparatus in accordance with the invention mounted in an oil tank;

FIG. 2 is a front view of the apparatus shown in FIG. 1, and

FIG. 3 is a side view of the same apparatus, partly in section.

In the drawings, 1 and 2 represent the cylindrical sidewall and bottom respectively of a large diameter oil storage tank. A manhole entry 3 is located in the sidewall close to the bottom of the tank and includes a manhole flange 4 to which a cover normally is fastened and which is removed to clean the tank. The foregoing are conventional parts of oil storage tanks.

The novel apparatus of the present invention includes first a vertical flange 5 shaped to cover a lower part of the manhole entry and adapted to be fastened securely to the manhole flange, for example by bolts using the boltholes normally used for the manhole cover. An aperture 6 through the flange 5 permits liquid to pass through the flange below the level of the top thereof. A receiving vessel 7 is attached securely, for example by welding, to the outside of the flange 5, so that liquid, flowing out of the storage tank through the aperture 6, flows into the vessel 7 and is removed therefrom through outlet 8, by a pump or other suitable means, for storage or disposal. A long open trough 9 is attached securely, for example by welding, to the inside of the flange 5, with the bottom inside of the trough at the level of the bottom of the aperture 6. The end of the trough remote from the flange is closed by an endwall, and the sides of the trough are of uniform equal height. The aperture and trough desirably have the same cross section, which conveniently can be rectangular as shown in the drawings. However the trough and aperture could equally well have another shape, for example semicircular or a triangular cross section, i.e. V-shape, it being necessary only that the aperture permit liquid to drain out of the trough and that the trough seal the aperture against passage of any liquid except that flowing from the trough. The dimensions of the trough must be such that it can be readily inserted into and removed from the tank through the manhole entry. Inasmuch as the manhole entries usually are holes of about 2 foot diameter and the trough can conveniently be only inches in cross section, for example rectangular 3 inches high by 7 inches wide or triangular with 8 inch sides, there is no difficulty in proportioning the trough to fit the tank. The length of the trough can be anything up to almost the complete diameter of the tank, and the greater the length the more rapidly the trough can remove the product from the tank. However, for ease of installation and handling it is usually adequate to have a trough shorter than the tank radius, e.g. about one half the tank radius or even only 10 to 15 feet in length. The closed end of the trough can be slightly cantilevered, but should be adjustably supported, preferrably primarily by adjustable support means which is arranged to set the two sides of the trough at a fixed level position throughout their entire length so the sides can act as submerged weirs to permit liquid to flow into the trough over its sides as the level of water rises in the storage tank. The support means 10 shown as a simple adjustable tripod can also be any adjustable support means of variable height, e.g. a bipod, or a series of separately adjustable supports. The final element of the apparatus, not shown in the drawings, is means to admit water to the storage tank below the level of the top of the trough, preferably below the level of the manhole entry. This may be as simple an arrangement as a hose running water into the tank through the manhole entry, but most conveniently is the water draw-off line with which large oil storage tanks are usually equipped.

In operation, the apparatus is arranged as described above, with the sides of the trough carefully levelled. Water is then forced into the tank, and any oil or other petroleum fraction in the tank floats on the water. As the level of water in the tank rises, the petroleum fraction forms a continuous layer on top of the water, and as it continues to rise the layer flows over the sides of the trough and into the trough, from whence it drains out through the aperture in the flange into the receiving vessel, the level sides of the trough serving as submerged weirs. In this manner all the petroleum fraction in the tank is floated into the trough by the rising water until finally water begins to flow into the trough, at which time water supply to the tank is stopped. The petroleum fraction in the receiving vessel is drained or pumped to any appropriate storage tank or disposal point throughout the operation. If desired the receiving vessel may be equipped with decanter means to separate water which starts to flow out of the tank as the last of the petroleum fraction floats therefrom. The water which has accumulated in the storage tank during the operation is then removed from the tank in any convenient manner, e.g. through a water draw-off line as mentioned above.

The apparatus is most conveniently fabricated from metal plate of appropriate thickness to give it the rigidity required to maintain the sides of the trough in a fixed level position. Preferably aluminum plate is used, because it is reasonably easy to fabricate, is readily available in a variety of thicknesses appropriate for various parts, forms a relatively lightweight and readily handled piece of equipment, and does not create any risk of forming sparks which would be an extreme hazard around gasoline storage tanks.

Besides helping to ensure maintenance of the quality of the product to be stored in a tank after a product change in the tank and facilitating economic recovery of the last recoverable quantities of the product previously stored in the tank, the invention also serves a useful purpose in helping to eliminate the pollution that occurrs when large oil storage tanks are cleaned out merely by flushing with water and allowing the flushed material to escape through the manhole onto the ground and drain over the ground or through sewers to ultimate recovery means, for example an API gravity separator. The efficiency of the separation and recovery of oil, from a tank with the apparatus of the present invention, is regulated largely by the care with which the sides of the trough, acting as weirs, are levelled to permit flow of oil and simultaneously restrain the flow of water into the trough. A trough only 10 feet long provides 20 feet of weir crest to pass oil continuously from a rising water surface; this is 10 times the maximum separating crest that could be provided across the mouth of a 2-foot diameter manhole when a tank is emptied of oil by merely flushing it out through the manhole with water. Thus the rate of recovery of oil residue from a storage tank using the apparatus of the present invention can easily be many times faster than can be achieved without the apparatus by merely flushing the tank with water. Furthermore the receiving vessel part of the apparatus, illustrated in the drawings and so far described herein as an open vessel, could readily be enclosed and appropriately vented to prevent the escape of volatile fumes, thus radically reducing the explosion hazard involved in recovering volatile materials such as gasoline.

Numerous other modifications and variations of the specific expedients described may be made without departing from the present invention, the scope of which is defined in the following claims.

What is claimed is:

1. In combination with a vertical cylindrical storage tank having a manhole entry near the bottom thereof, a skimming apparatus for removing water immiscible liquids of specific gravity below one from the tank, said apparatus comprising (1) a vertical flange of shape adapted to be fastened to, and to cover, the lower part of said manhole entry, with an aperture in the flange to permit free flow of liquid through the flange from inside the tank, (2) a receiving vessel fastened to the flange outside the manhole entry below the aperture to receive liquid flowing out of the tank and to conduct same to storage or other disposal, (3) an elongated open trough having level sides of uniform equal height below the level of the top of the vertical flange and with one end fastened to the flange at the aperture to permit flow of liquid by gravity from the trough through the aperture to the receiving vessel, said trough also having (a) a closed end remote from said flange, (b) dimensions to permit its insertion into and removal from the tank through the manhole entry, and (c) adjustable support means near said remote end adapted to support the sides of the trough in a fixed level position throughout their entire length, and (4) means to admit water to the storage tank below the level of the manhole entry at a rate to float the immiscible liquid and thereby force it to overflow the sides of the trough and flow by gravity out of the storage tank through the aperture in the flange into the receiving vessel.

2. An apparatus as claimed in claim 1, in which the aperture in the flange and the elongated trough have a corresponding rectangular cross-section.

3. An apparatus as claimed in claim 2 in which the trough has a length equal to about one half the tank radius.

4. An apparatus as claimed in claim 1 having a flange, receiving vessel, trough, and adjustable support means fabricated of aluminum.

* * * * *